US009594416B2

(12) United States Patent
Kwon

(10) Patent No.: US 9,594,416 B2
(45) Date of Patent: Mar. 14, 2017

(54) ANALOG CURRENT OUTPUT MODULE

(71) Applicant: LSIS CO., LTD., Anyang-si, Gyeonggi-do (KR)

(72) Inventor: Jae Il Kwon, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 99 days.

(21) Appl. No.: 14/535,103

(22) Filed: Nov. 6, 2014

(65) Prior Publication Data
US 2015/0214728 A1 Jul. 30, 2015

(30) Foreign Application Priority Data

Jan. 27, 2014 (KR) ........................ 10-2014-0009478

(51) Int. Cl.
*H02H 3/00* (2006.01)
*G06F 1/30* (2006.01)
*G06F 1/26* (2006.01)
*G06F 1/28* (2006.01)
*H02H 3/087* (2006.01)

(52) U.S. Cl.
CPC ................ *G06F 1/30* (2013.01); *G06F 1/266* (2013.01); *G06F 1/28* (2013.01); *H02H 3/087* (2013.01)

(58) Field of Classification Search
CPC ........................................................ G06F 1/30
USPC ........................................................ 361/93.1
See application file for complete search history.

(56) References Cited

U.S. PATENT DOCUMENTS

| | | | | | |
|---|---|---|---|---|---|
| 4,423,459 | A | * | 12/1983 | Stich | H02H 3/44 361/87 |
| 4,891,730 | A | * | 1/1990 | Saddow | H01L 23/20 257/E23.138 |
| 5,684,850 | A | * | 11/1997 | Warburton | G01T 1/171 378/53 |
| 6,556,164 | B2 | * | 4/2003 | Schmid | H03M 1/462 341/155 |
| 6,594,129 | B1 | * | 7/2003 | Baba | H03K 17/0822 361/87 |
| 6,975,259 | B1 | * | 12/2005 | Jensen | H03M 3/478 341/143 |
| 2002/0079859 | A1 | * | 6/2002 | Lumsden | H02P 27/02 318/727 |
| 2002/0145841 | A1 | * | 10/2002 | Williams | H02H 1/04 361/93.1 |

(Continued)

Primary Examiner — Stephen W Jackson
(74) Attorney, Agent, or Firm — Lee, Hong, Degerman, Kang & Waimey PC

(57) ABSTRACT

An analog current output module includes an MPU generating and outputting a digital signal, a D/A converter converting the digital signal into an analog signal and outputting the analog signal, an analog current output circuit outputting a control current corresponding to the analog signal output from the D/A converter, and an overload detecting unit detecting whether an overload occurs by measuring the control current and comparing a value of the control current and a preset reference value, wherein the overload detecting unit sets the reference value on the basis of a reference value generating signal delivered from the MPU, and the overload detecting unit comprises a comparator comparing the control current value and the reference value and detecting whether the overload occurs, and a reference value setting unit generating the reference value according to the reference value generating signal and providing the reference value to the comparator.

9 Claims, 3 Drawing Sheets

(56) References Cited

U.S. PATENT DOCUMENTS

| | | | |
|---|---|---|---|
| 2003/0048587 A1* | 3/2003 | Lai | H02H 3/04 361/42 |
| 2006/0072256 A1* | 4/2006 | Miller | H02H 1/0015 361/42 |
| 2006/0227028 A1* | 10/2006 | Balogh | H02M 3/157 341/144 |
| 2008/0080105 A1* | 4/2008 | Blaha | H04L 12/10 361/38 |
| 2009/0009143 A1* | 1/2009 | Odaohhara | H02J 7/045 320/162 |
| 2012/0013385 A1* | 1/2012 | Kwon | G05B 9/02 327/325 |
| 2016/0072275 A1* | 3/2016 | Caldwell | H02H 7/12 361/91.1 |

* cited by examiner

FIG. 2

| EMBODIMENT | USER SET IMPEDANCE (NOT GREATER THAN 600Ω) | CURRENT OUTPUT VALUE IL(mA) | REFERENCE VOLTAGE $V_{REF}$ (V) | LOAD DETECTION MARGIN CONSTANT (15%) | DIGITAL POTENTIOMETER RESISTANCE VALUE ($R_1+R_2$) | LOAD MONITORING VALUE RATIO | VOLTAGE DIVISION RESISTANCE R2 (kΩ) | ACTUAL LOAD IMPEDANCE (Ω) | COMPARISON RESULT (On/Off) | OCCURRENCE OR NONOCCURRENCE OF OVERLOAD |
|---|---|---|---|---|---|---|---|---|---|---|
| EMBODIMENT 1 | 300Ω | 4mA | 18V | 1.15 | 100kΩ | 0.077 | 7.67kΩ | 300Ω | Off | NORMAL |
| EMBODIMENT 2 | 300Ω | 10mA | 18V | 1.15 | 100kΩ | 0.192 | 19.2kΩ | 300Ω | Off | NORMAL |
| EMBODIMENT 3 | 300Ω | 20mA | 18V | 1.15 | 100kΩ | 0.383 | 38.3kΩ | 300Ω | Off | NORMAL |
| EMBODIMENT 4 | 300Ω | 20mA | 18V | 1.15 | 100kΩ | 0.383 | 38.3kΩ | 300Ω | On | OVERLOAD |

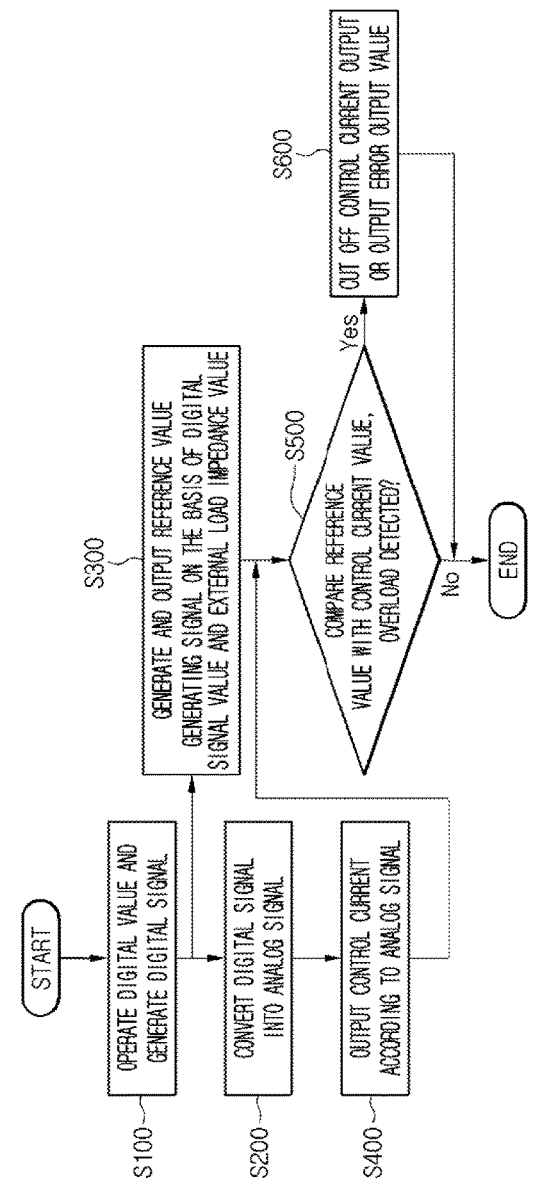

ANALOG CURRENT OUTPUT MODULE

CROSS-REFERENCE TO RELATED APPLICATIONS

Pursuant to 35 U.S.C. §119(a), this application claims the benefit of earlier filing date and right of priority to Korean Patent Application No. 10-2014-0009478, filed Jan. 27, 2014, the contents of which are hereby incorporated by reference herein in its entirety.

BACKGROUND

The present disclosure relates to an analog current output module, and particularly, to an analog current output module capable of preventing damages to a programmable logic controller (PLC) module and an external load system and improving stability by detecting a current output overload state that may occur due to malfunctions or interconnection errors of an external current load device and cutting off an output in advance.

A PLC is a computer capable of controlling various automation machines and processors by embedding functions such as a numerical operation, a logical operation, a sequencing control, a timer, and a counter therein, and including a memory capable of storing programs and various data The PLC may be applied to various jobs including a device control, device numerical setting, time control, real-time monitoring, real time data collection and safe device activation.

The PLC includes an analog output module for providing signals to automation facility equipment, and an analog input module for receiving the signals output from the automation facility equipment. The analog input module plays a role of converting an analog signal delivered from the automation facility equipment into a digital signal and delivering the digital signal to an internal operation processing unit. In addition, the analog output module plays a role of receiving the digital signal from the operation processing unit, converting the digital signal into an analog signal and delivering the analog signal to the automation facility equipment. The analog signal delivered to the automation facility equipment may be in a voltage type or in a current type. Accordingly, the analog output module of the PLC includes an analog voltage output module outputting an analog signal in a voltage type and an analog current output module outputting an analog signal in a current type.

A typical analog current output module for the PLC converts the digital value into an analog value without additional manipulation, and outputs the analog value.

The PLC is a general purpose controller used in an industrial field, and an external load system thereof is also various. In a case where external load impedance is higher than a standard value due to occurrence of malfunctions or interconnection errors in a specific load device among various systems, an analog voltage is excessively increased and the external load system and the analog current output module may become damaged.

In order to address this issue, a PLC user is required to install an additional overload cut-off device between the external load system and the analog current output module for each output channel and accordingly an installation cost is increased. In addition, the overload cut-off device may also have a malfunction or interconnection error issue.

SUMMARY

Embodiments provide analog current output modules capable of preventing a PLC module and an external load system from being damaged by detecting a current output overload state that may occur due to malfunctions or interconnection errors in an external current overload device and cutting off an output in advance.

Embodiments also provide analog current output modules including: a micro processor unit (MPU) generating and outputting a digital signal; a digital-to-analog (D/A) converter converting the digital signal into an analog signal and outputting the analog signal; an analog current output circuit outputting a control current corresponding to the analog signal output from the D/A converter; and an overload detecting unit detecting whether an overload occurs by measuring the control current and comparing a value of the control current and a preset reference value, wherein the overload detecting unit sets the reference value on the basis of a reference value generating signal delivered from the MPU, and the overload detecting unit comprises a comparator comparing the control current value and the reference value and detecting whether the overload occurs, and a reference value setting unit generating the reference value according to the reference value generating signal and providing the reference value to the comparator.

The details of one or more embodiments are set forth in the accompanying drawings and the description below. Other features will be apparent from the description and drawings, and from the claims.

BRIEF DESCRIPTION OF THE DRAWINGS

FIG. 2 is a table representing a case of determining whether an overload occurs by using an analog current output module according to an embodiment.

FIG. 3 is a flowchart illustrating an operation of an analog current output module according to an embodiment.

DETAILED DESCRIPTION OF THE EMBODIMENTS

Figure 1:
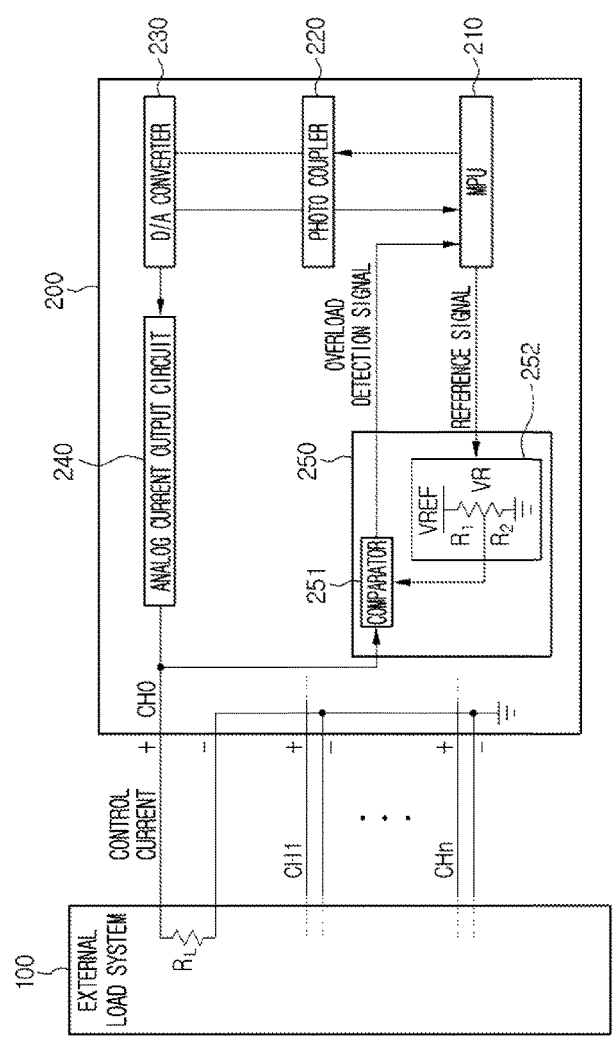
FIG. 1 is a configuration diagram of an analog current output module according to an embodiment.

Reference will now be made in detail to the embodiments of the present disclosure, examples of which are illustrated in the accompanying drawings.

An analog current output module according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Description about an analog current output module according to an embodiment will be provided with reference to FIGS. 1 to 3.

Firstly, the embodiment may prevent a load system and an analog current output module from being damaged in a case where external load impedance is higher than a standard value due to malfunctions or interconnection errors of a load device.

FIG. 1 illustrates a configuration of an analog current output module according to an embodiment.

Referring to FIG. 1, an analog current output module 200 outputs a control current to an external load system 100. The external load system 100 is driven by a current signal and the control current has an analog current value. Furthermore, the external load system 100 has external load impedance RF and the external load impedance RL may be not greater than 600Ω and a value thereof may be changed by a user.

On the other hand, the analog current output module 200 may include a micro processor unit (MPU) 210, a photo coupler 220, a digital-to-analog (D/A) converter 230, an analog current output circuit 240, and an overload detecting unit 250.

In addition, the analog current output module 200 may include a plurality of channels, and the photo coupler 220, the D/A converter 230, the analog current output circuit 240, and the overload detecting unit 250 may form one channel. The plurality of channels receive a digital value from the MPU 210, and output a control current having an analog value. Hereinafter, one channel configuration is mainly described.

The MPU 210 performs an internal sequence process for a current output and generates a digital signal having a digital value and outputs the digital signal. In addition, the digital signal is converted into an analog signal by the D/A converter 230 through the photo coupler 220.

In addition, the MPU 210 delivers reference value information (a reference value generating signal) that is a reference for detecting an overload to the overload detecting unit 250. At this point, the reference value information is set by the MPU 210 and the MPU 210 sets the reference value information on the basis of a value (an impedance value) of the external load impedance RL of the external load system 100 and the generated digital signal value.

The photo coupler 220 insulates a digital circuit from an analog circuit, and delivers a digital signal output from the MPU 210 into the D/A converter 230.

The D/A converter 230 converts the digital signal into an analog signal and amplifies the analog signal, and delivers the analog signal to the analog current output circuit 240.

The analog current output circuit 240 outputs the control current according to the analog signal output from the D/A converter 230. The control current may be in from 4 to 20 mA, and drive the external load system 100 of which external load resistance is not greater than 600Ω.

The overload detecting unit 250 measures the control current output to the external load system 100 and detects whether an overload occurs on the basis of the measured control current value. And the overload detecting unit 250 outputs an overload detection signal to MPU 210 when detecting the overload.

When the overload detecting unit 250 outputs the overload detection signal, the MPU 210 cuts off an output of the control current or generates a preset error output current value. By this operation, the external load system 100 and the analog current output module 200 are prevented from being damaged due to the overload.

The error output current value is preset as a value not greater than a value corresponding to the overload, when the overload occurs. In addition, the MPU 210 generates an error code and provides it to an external user when receiving the overload detection signal.

On the other hand, the overload detecting circuit 250 measures the control current and includes a comparator 251 comparing a control current value and a reference value and determining whether an overload occurs, and a reference value setting unit 252 connected to the comparator 251 and providing, to the comparator 251, the reference value varied according to a reference value generating signal (the reference value information) delivered from the MPU 210.

For example, the reference value setting unit 252 may be a digital potentiometer and adjust a voltage division ratio of the digital potentiometer according to the reference value generating signal. In addition, the reference value setting unit 252 may re-set the adjusted value to the reference value and provide the reference value to the comparator 251.

At this point, the reference value $V_r$ may be determined according to the following Equation (1):

$$V_r = \frac{R_2}{R_1 + R_2} = M_1 \times \frac{R_L \times I_L}{V_{REF}}$$

where, $R_1$ and $R_2$ are for a voltage division ratio ($R_1:R_2$) of the digital potentiometer, $M_1$ denotes a load detection margin constant, $R_L$ denotes external load impedance, $I_L$ denotes a D/A converted current output value, and $V_{REF}$ denotes a reference voltage.

FIG. 2 is a table representing a case of determining whether an overload occurs by using an analog current output module according to an embodiment. Whether the overload occurs is determined in a case where the control currents are 4 mA, 10 mA, and 20 mA respectively in a state where user set impedance set by a user is 300Ω, a reference voltage is 18V, a load detection margin constant is 15%, and a total resistance value of the digital potentiometer is 100 kΩ.

Referring to the table of FIG. 2, in embodiments 1 to 3, when the user setting impedance is 300Ω, it is determined that actual external load impedance is 300Ω and the overload does not occur. In addition, in embodiment 4, even though the user set impedance is 300, since actual load impedance is 500Ω due to malfunctions or interconnection errors in the external load system, it is determined that the overload state occurs.

FIG. 3 is a flowchart illustrating an operation of an analog current output module according to an embodiment.

Referring to FIG. 3, a digital signal generating operation S100 of generating a digital signal to be converted into an analog signal is performed. The digital signal generation is made by the MPU 210, and the MPU 210 operates an actual digital value to be actually output, and generates and output the digital value.

In addition, the generated digital signal is converted into an analog signal by using the D/A converter 230, and the converted analog signal is output (operation S200, a conversion operation). In other words, the digital signal generated from the MPU 210 is delivered to the D/A converter 230 through the photo coupler 220, and converted into an analog signal by the D/A converter 230.

In addition, a reference value generating signal is generated on the basis of the digital signal value generated in the digital signal generating operation S100 and an external load impedance value, and a reference value generating signal outputting operation S300 is performed. Here, the reference value generating signal is generated by the MPU 210, and the generated reference value generating signal is output to the overload detecting unit 250.

Then, a control current outputting operation S400 of outputting the control current according to an analog signal output from the converting operation S200 is performed.

Furthermore, whether an overload occurs is determined (operation S500) by comparing a reference value set on the basis of the reference value generating signal output from the reference value generating signal output operation S300 and the control current value output from the control current output operation S400. At this point, the reference value setting unit 252 of the overload detecting unit 250 generates the reference value on the basis of the reference value generating signal and provides the generated reference value to the comparator 251. In addition, the comparator 251 compares the reference value and the control current value and determines whether the overload occurs.

When it is determined that the overload occurs in the overload occurrence determining operation S500, the control current output is cut off or a preset error output current value is output S600. At this point, when the comparator 251 delivers the overload detection signal to the MPU 210, and the MPU 210 receives the overload detection signal, the control current output is cut off or the preset error output current value is delivered. In addition, the MPU 210 may generate an error code and provide the error code to an external user.

According to embodiments, an overload state occurred due to malfunctions or interconnection errors of an external load system can be detected in advance by adding an overload detecting unit to an analog current output module. In this way, when the overload state is detected, an external load system and an analog current output module can be prevented from being damaged by cutting off a current output or outputting a preset error output value.

In addition, since a reference value for determining an overload is set on the basis of a load impedance value of an external load system and a digital signal value generated by the MPU, even though the external load system is changed, an optimal load monitoring algorithm changeable according to a corresponding load can be provided and user's convenience can be improved.

According to embodiments, an overload state of an external load system due to malfunctions or interconnection errors can be detected by preparing an overload detecting unit in an analog current output module.

In addition, when the overload state is detected, a current output is cut off or a preset error output value is output and the external load system and analog current output module are prevented from being damaged.

In addition, since a reference value for determining an overload is set on the basis of a load impedance value of an external load system and a digital signal value generated by an MPU, even though the external load system is changed, a load monitoring algorithm changeable according to a corresponding load can be provided.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is within the purview of one skilled in the art to affect such feature, structure, or characteristic in connection with other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An analog current output module comprising:
   a micro processor unit (MPU) configured to generate and output a digital signal;
   a digital-to-analog (D/A) converter configured to convert the digital signal into an analog signal and to output the analog signal;
   an analog current output circuit configured to output a control current corresponding to the analog signal output from the D/A converter, the control current having an analog current value; and
   an overload detecting unit comprising:
   a reference value setting unit configured to generate a reference value according to a reference value generating signal provided from the MPU, and
   a comparator configured to compare a value of the control current provided from the analog current output circuit and the reference value from the reference value setting unit and to generate an overload detection signal based on the comparison,
   wherein the MPU is further configured to cut off an output of the control current from analog current output circuit in response to the overload detection signal.

2. The analog current output module according to claim 1, wherein the MPU is further configured to determine the reference value generating signal on the basis of a value of the digital signal and a value of the external load impedance.

3. The analog current output module according to claim 1, wherein the MPU is further configured to output a preset error output current value in response to the overload detection signal.

4. The analog current output module according to claim 1, wherein the MPU is further configured to generate an error code and provide the error code in response to the overload detection signal.

5. The analog current output module according to claim 1, wherein the reference value setting unit is a digital potentiometer, and
   the digital potentiometer is configured to adjust a voltage division ratio thereof according to the reference value generating signal, and provide the adjusted value to the comparator.

6. The analog current output module according to claim 5, wherein the reference value $V_r$ is determined according to the following Equation:

$$V_r = \frac{R_2}{R_1 + R_2} = M_1 \times \frac{R_L \times I_L}{V_{REF}}$$

where, $R_1$ and $R_2$ are for a voltage division ratio ($R_1:R_2$) of the digital potentiometer, $M_1$ denotes a load detecting margin constant, $R_L$ denotes external load impedance, $I_L$ denotes a D/A converted current output value, and $V_{REF}$ denotes a reference voltage.

7. The analog current output module according to claim 1, further comprising a photo coupler configured to provide the digital signal output from the MPU to the D/A converter,
   wherein the photo coupler is further configured to insulate a digital circuit from an analog circuit.

8. The analog current output module according to claim 1, wherein the control current is in from 4 to 20 mA.

9. The analog current output module according to claim 1, wherein the MPU sets the reference value setting information on the basis of external load impedance of an external load system.

* * * * *